United States Patent Office 3,506,768
Patented Apr. 14, 1970

3,506,768
COMPOSITION AND METHOD FOR ANESTHETIZING USING 3-CHLORO-1,1,2,2,3-PENTAFLUOROPROPANE
Bernard M. Regan, Chicago, Ill., assignor to Baxter Laboratories, Inc., Morton Grove, Ill., a corporation of Delaware
No Drawing. Filed Jan. 18, 1968, Ser. No. 698,687
Int. Cl. A61k *13/00*
U.S. Cl. 424—350    3 Claims

ABSTRACT OF THE DISCLOSURE

A method for anesthetizing animals by administration of the compound 3-chloro-1,1,2,2,3-pentafluoropropane.

---

This invention relates to the halogenated propane compound, 3-chloro-1,1,2,2,3-pentafluoropropane, and more particularly to the method of utilizing said compound as a general anesthetic agent.

3-chloro-1,1,2,2,3-pentafluoropropane is a known compound having a boiling point of about 44° C. at 760 mm. pressure and is generally prepared by the photochlorination of 1,1,2,2,3-pentafluoropropane or the thermal chlorination of the latter compound at about 250° C. as disclosed by Beck in a dissertation, "Reactivities of Aliphatic Fluorides," the Ohio State University (1959), published by University Microfilms, Inc., Ann Arbor, Mich., and particularly described at pp. 35–36, 38 and 41. Its proton nuclear magnetic resonance (NMR) is described by Elleman et al., J. Mol. Spectroscopy, vol. 7, pp. 322–40 (1961).

Surprisingly and unexpectedly, it has now been found that 3 - chloro - 1,1,2,2,3-pentafluoropropane has an anesthetic potency about four times that of its position isomer, 3-chloro-1,1,1,2,2-pentafluoropropane, heretofore disclosed as having weak anesthetic properties in mice by Burns et al., Anesthesia, vol. 17, pp. 337–43 (1962). The low concentration of the halogenated propane compound of the present invention required to produce anesthesia coupled with its flammability margin of safety in oxygen gives it a significant and substantial advantage over the position isomer which Burns et al. stated did not show sufficient promise to warrant further testing.

The utility of 3-chloro-1,1,2,2,3-pentafluoropropane has been further demonstrated by its inhalation margin of safety in mice when compared with several conventional general anesthetics, namely, chloroform, ether and halothane. The five minute median anesthetic concentration, $AC_{50}$, of 3-chloro-1,1,2,2,3-pentafluoropropane is 1.46% and the five minute median lethal concentration, $LC_{50}$, is 7.29%. Thus, the inhalation margin of safety, $LC_{50}/AC_{50}$, in mice is about 5. Under the same conditions, the inhalation margin of safety for halothane is 3.4, that of chloroform is 2.8 and that of ether is 3.6.

The halogenated propane compound of the present invention when used as an anesthetic agent should not contain toxic impurities, which may be present according to the particular process used for its manufacture. In the preparation of this compound by the photochlorination of 1,1,2,2,3-pentafluoropropane, the desired anesthetic compound has been separated from its reaction components by fractional distillation followed by preparative gas liquid chromatography (GLC) to provide a product which assayed 99.8% pure 3-chloro-1,1,2,2,3-pentafluoropropane.

The anesthetic agent of this invention can be employed to induce anesthesia by any conventional procedure or means of administering general anesthetics. In the preferred method of administration, 3-chloro-1,1,2,2,3-pentafluoropropane is administered to warm-blooded, air-breathing animals by inhalation in admixture with at least one other constituent comprising oxygen, preferably in controlled amounts of a gaseous vehicle. Thus, the anesthetic agent can be vaporized and mixed with oxygen, for example, as pure oxygen or as air, to form a gaseous inhalant anesthetic composition containing a sufficient amount of the anesthetic agent to produce a desired depth of anesthesia and a sufficient amount of oxygen to maintain adequate respiration in the subject undergoing anesthesia. The anesthetic agent vapor and oxygen or gaseous mixture containing oxygen can be premixed, or can be mixed during administration to provide the desired amounts of anesthetic agent and oxygen to the recipient. The anesthetic composition of this invention can also contain, if desired, one or more known inhalant anesthetics, for example, halothane, chloroform, diethyl ether, nitrous oxide, cyclopropane, methoxyflurane, trifluoroethyl vinyl ether and trichloroethylene.

Preferably, the inhalant anesthetic composition of this invention contains from about 1% to about 10% by volume of 3 - chloro-1,1,2,2,3-pentafluoropropane in admixture with oxygen or gaseous mixtures containing oxygen in sufficient amount to maintain respiration.

The invention is illustrated by the following example.

EXAMPLE 3-chloro-1,1,2,2,3-pentafluoropropane (0.50 ml., 4.5 millimoles) was injected through a rubber dam during 50 seconds onto the walls of each of two 6.3 liter desiccator jars each containing five male mice (each 20–24 grams body weight). The jars were rotated to mix the anesthetic vapor and air. Eight of the ten mice were fully anesthetized in 2 to 4 minutes, and no undesirable side effects were noticed. The anesthetic composition was calculated in accordance with the ideal gas law to contain 1.7% by volume of 3-chloro-1,1,2,2,3-pentafluoropropane and 98.3% by volume of air.

The above procedure was repeated at various concentrations of 3-chloro-1,1,2,2,3-pentafluoropropane in admixture with air and at various concentrations of the position isomer 3-chloro-1,1,1,2,2-pentafluoropropane in admixture with air to determine for both compounds the comparative volume percent of anesthetic compound required to produce negative righting reflex in 50% of the test mice in five minutes ($AC_{50}$) by graphic estimation according to the procedure described by Miller et al., Proc. Socy. Exper. Biol. Med., vol. 57, pp. 261–4 (1944). By this procedure the anesthetic compound of this invention was found to have an anesthetic potency ($AC_{50}=1.46$) greater than four times that of said position isomer ($AC_{50}=6.03$).

The flammability of gaseous mixtures of 3-chloro-1,1,2,2,3-pentafluoropropane and oxygen was determined at normal room temperature (23° C.) and atmospheric pressure by visualization of the downward propagation of a flame in a glass bottle having a cylindrical portion 2.3 inches I.D. x 3.5 inches in height. The bottle was flushed with pure oxygen, a known quantity of the liquid anesthetic was added rapidly, and the bottle was immediately closed with a ground glass stopper. The bottle was then rotated and shaken until the liquid anesthetic was completely vaporized and uniformly mixed with oxygen. The stopper was then removed and immediately a burning stick inserted in the bottle 1.5 to 2.0 inches below the bottle mouth. The concentration by volume percent of the gaseous anesthetic in oxygen was determined by application of the ideal gas law.

The above procedure was repeated at various concentrations of 3-chloro-1,1,2,2,3-pentafluoropropane in admixture with oxygen and at various concentrations of the position isomer 3-chloro-1,1,1,2,2-pentafluoropropane in admixture with oxygen to determine for each compound the lower flammability limit in oxygen ($LFlO_2$) and to calculate therefrom the flammability margin of safety ($LFIO_2/AC_{50}$). The lower flammability limit is stated as a range of two concentrations by volume percent of the anesthetic in the gaseous mixture; downward flame propagation was observed at the higher concentration but not at the lower concentration. By this procedure the flammability margin of safety of the anesthetic agent of this invention was found to be about 7.1 ($LFIO_2/AC_{50}=10.1-10.7/1.46$), which is four times the corresponding 1.8 flammability margin of safety of said position isomer ($LFIO_2/AC_{50}=10.4-11.0/6.03$).

What is claimed is:

1. A method for anesthetizing an animal which comprises administering to said animal an inhalation effective amount of 3-chloro-1,1,2,2,3-pentafluoropropane.

2. The method of claim 1 in which the 3-chloro-1,1,2,2,3-pentafluoropropane in an amount of from about 1% to about 10% by volume is in admixture with from about 99% to about 90% by volume of a substance selected from the group consisting of oxygen or a gaseous mixture containing oxygen in sufficient amount to support respiration.

3. A non-flammable anesthetic composition comprising from about 1% to about 10% by volume of 3-chloro-1,1,2,2,3-pentafluoropropane in admixture with from about 99% to about 90% by volume of a substance selected from the group consisting of oxygen or a gaseous mixture containing oxygen in sufficient amount to support respiration.

References Cited

Chemical Abstracts 58: 7264h–7265a (1963).

ALBERT T. MEYERS, Primary Examiner

J. D. GOLDBERG, Assistant Examiner